United States Patent
Matsuyama et al.

(10) Patent No.: US 10,661,752 B2
(45) Date of Patent: May 26, 2020

(54) CAR SHARING SYSTEM

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Takanori Matsuyama, Aichi (JP); Hidenobu Hanaki, Aichi (JP); Junji Murase, Aichi (JP); Yosuke Doi, Aichi (JP); Yuichiro Haruna, Oyama (JP); Masaki Oshima, Aichi (JP)

(73) Assignees: KABUSHIKI KAISHA TOKAI RIKA DENKI SEISAKUSHO, Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/151,888

(22) Filed: Oct. 4, 2018

(65) Prior Publication Data

US 2019/0106084 A1 Apr. 11, 2019

(30) Foreign Application Priority Data

Oct. 10, 2017 (JP) .................................. 2017-196935

(51) Int. Cl.
*B60R 25/24* (2013.01)

(52) U.S. Cl.
CPC ........ *B60R 25/24* (2013.01); *B60R 2325/101* (2013.01); *B60R 2325/103* (2013.01); *B60R 2325/108* (2013.01); *B60R 2325/205* (2013.01)

(58) Field of Classification Search
None
See application file for complete search history.

(56) References Cited

U.S. PATENT DOCUMENTS 9,168,895 B2 * 10/2015 Hatton .................. B60R 25/24
2017/0278329 A1   9/2017 Konishi

FOREIGN PATENT DOCUMENTS

| JP | 2004-100346 | 4/2004 |
| JP | 2011-063961 | 3/2011 |
| JP | 2016-016835 | 2/2016 |
| JP | 2016-071834 | 5/2016 |
| JP | 2016-115077 | 6/2016 |
| JP | 2016-170788 | 9/2016 |
| JP | 2017-175357 | 9/2017 |

* cited by examiner

*Primary Examiner* — K. Wong
(74) *Attorney, Agent, or Firm* — Greenblum & Bernstein, P.L.C.

(57) ABSTRACT

A car sharing system includes a car share device installed in a vehicle. The car share device includes a key function unit configured to verify an electronic key ID used by an electronic key system of the vehicle. The car sharing system further includes a key function invalidating unit that invalidates the key function unit when a condition is satisfied for switching the key function unit from a valid state to an invalid state.

5 Claims, 3 Drawing Sheets

CAR SHARING SYSTEM

CROSS-REFERENCE TO RELATED APPLICATIONS

This application is based upon and claims the benefit of priority from prior Japanese Patent Application No. 2017-196935, filed on Oct. 10, 2017, the entire contents of which are incorporated herein by reference.

FIELD

This disclosure relates to a car sharing system that shares a vehicle with a number of people.

BACKGROUND

Japanese Laid-Open Patent Publication Nos. 2016-115077 and 2016-71834 describe a car sharing system that shares a vehicle with a number of people. In such type of a car sharing system, for example, after registering for usage of the car share system, a reservation for a car is made with a mobile terminal (e.g., smartphone) to obtain permission to use the vehicle during the reserved time.

SUMMARY

In the car sharing system, when a user uses a reserved vehicle, operation of the vehicle is enabled. When the vehicle is left in a state in which operation of the vehicle is enabled, the vehicle may be stolen. Accordingly, there is a need to improve security of the vehicle against unauthorized user such as theft.

One embodiment of a car sharing system includes a car sharing system includes a car share device installed in a vehicle. The car share device includes a key function unit configured to verify an electronic key ID used by an electronic key system of the vehicle. The car share device is configured to communicate with a mobile terminal that is operable as a vehicle key when code information is registered to the mobile terminal. The car share device is further configured to authenticate the code information through wireless communication with the mobile terminal and permit actuation of an on-board device by verifying the electronic key ID with the electronic key system by the key function unit when the mobile terminal is operated to actuate the on-board device. The car sharing system further includes a key function invalidating unit that invalidates the key function unit when a condition is satisfied for switching the key function unit from a valid state to an invalid state.

Other embodiments and advantages thereof will become apparent from the following description, taken in conjunction with the accompanying drawings, illustrating by way of example the principles of the invention. It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

One embodiment of a car sharing system will now be described with reference to FIGS. 1 to 5.

Figure 1:
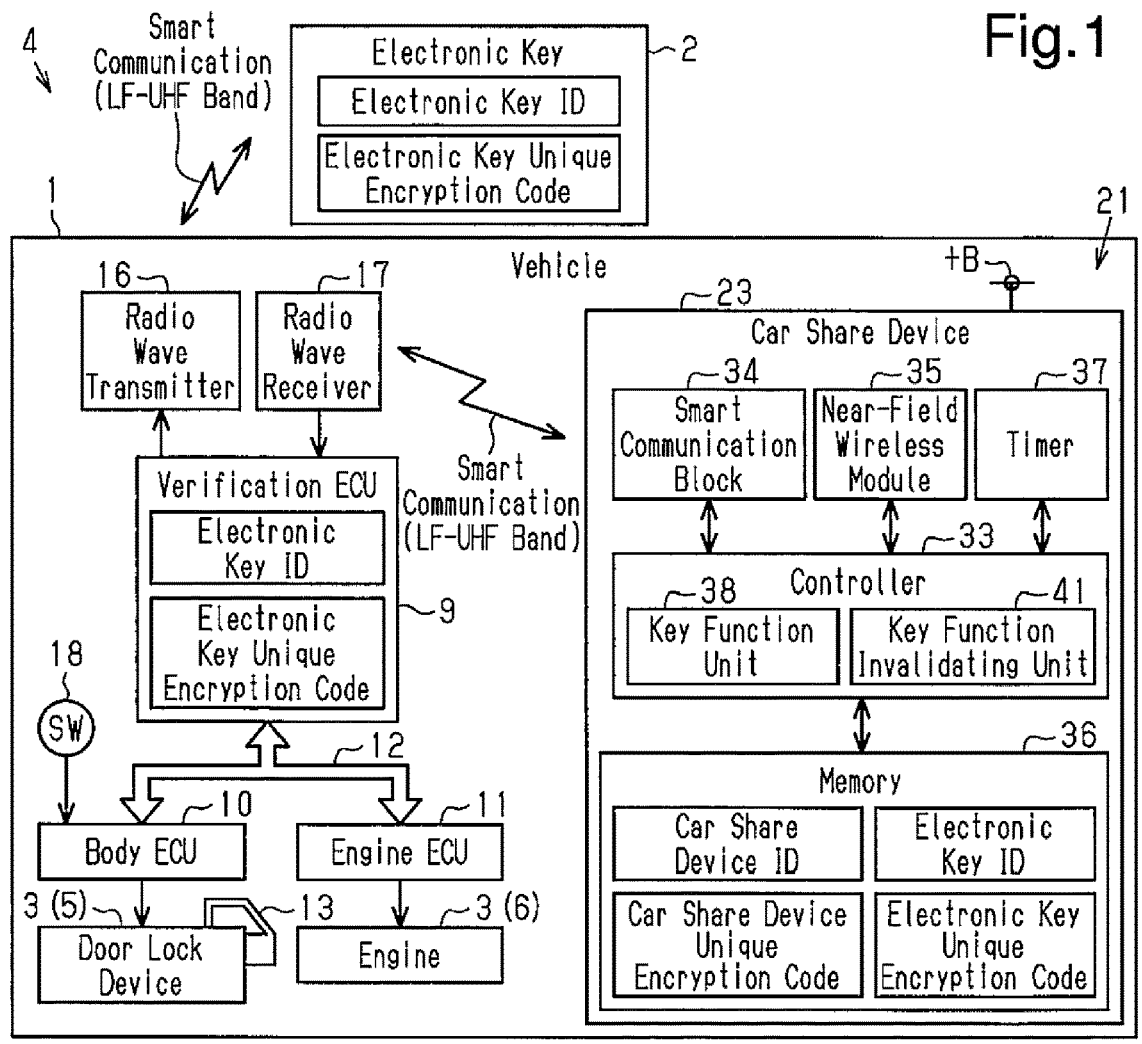
FIG. 1 is a schematic block diagram illustrating one embodiment of a car sharing system.
Figure 1:
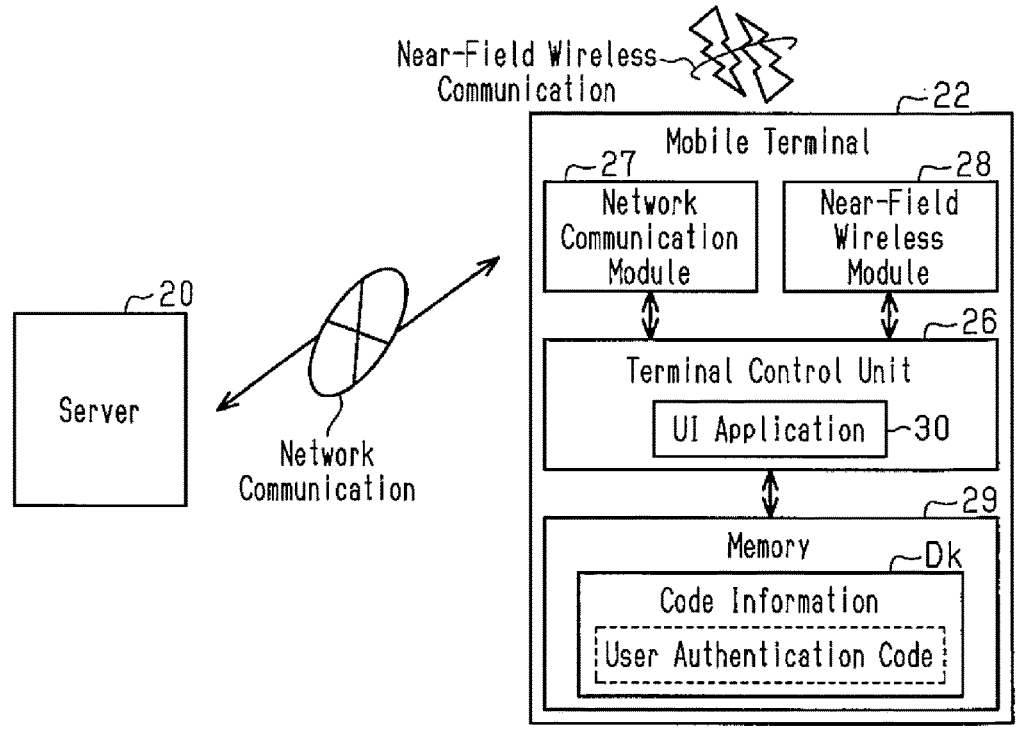

As illustrated in FIG. 1, a vehicle 1 is provided with an electronic key system 4. In one embodiment, the electronic key system 4 includes an electronic key 2 (vehicle key) and a verification electronic control unit (ECU) 9 that verifies the ID of the electronic key 2 through wireless communication with the electronic key 2. The verification ECU 9 executes or permits actuation of an on-board device 3 upon ID verification accomplishment of the electronic key 2. The electronic key system 4, which is a key-operation-free system, performs electronic key ID verification (also referred to as smart verification) through short range wireless communication initiated by the vehicle 1 (verification ECU 9). In the key-operation-free system, electronic key ID verification is automatically performed without directly operating the electronic key 2. The on-board device 3 may include, but not limited to, for example, a door lock device 5 and an engine 6.

The vehicle 1 includes the verification ECU 9, a body ECU 10 that manages the power supply for on-board electrical devices, and an engine ECU 11 that controls the engine 6. The body ECU 10 and the engine ECU 11 are each referred to as an on-board device ECU. The ECUs 9 to 11 are electrically connected to one another by a communication line 12 in the vehicle 1. The communication line 12 is, for example, a Controller Area Network (CAN), a Local Interconnect Network (LAN), or a combination of these networks. The verification ECU 9 and the electronic key 2 each include a memory (not illustrated) that stores an electronic key ID and an electronic key unique encryption code. The electronic key ID and the electronic key unique encryption code are information unique to the electronic key 2 that is registered to the vehicle 1 and used for electronic key ID verification. The body ECU 10 controls the door lock device 5 that locks and unlocks the vehicle door 13.

The electronic key system 4 further includes a radio wave transmitter 16 and a radio wave receiver 17 that are arranged in the vehicle 1. For example, the radio wave transmitter 16 may include an exterior transmitter (not illustrated) that transmits radio waves to the outside of the vehicle 1 and an interior transmitter (not illustrated) that transmits radio waves to the inside of the vehicle 1. The radio wave transmitter 16 transmits radio waves on the low frequency (LF) band. The radio wave receiver 17 receives radio waves on the ultrahigh frequency (UHF) band. Accordingly, in the electronic key system 4, the verification ECU 9 communicates with the electronic key 2 through LF-UHF bidirectional communication.

As the electronic key 2 enters a communication area formed by a wake signal on LF radio waves transmitted from the radio wave transmitter 16, the electronic key 2 receives the wake signal and shifts from a standby state to an activated state. Upon activation of the electronic key 2, the verification ECU 9 performs ID verification (smart verification) on the electronic key 2. In a non-restrictive example, the smart verification performed between the electronic key 2 and the verification ECU 9 includes electronic key ID verification that authenticates the electronic key 2 and challenge-response authentication that uses the electronic key unique encryption code. The electronic key ID verification performed under a situation in which the electronic key 2 is located outside the vehicle 1 is referred to as exterior smart verification. When exterior smart verification is accomplished, the verification ECU 9 permits or performs locking or unlocking of the vehicle door 13 with the body ECU 10.

The electronic key ID verification performed under a situation in which the electronic key 2 is located inside the vehicle 1 is referred to as interior smart verification. When interior smart verification is accomplished, the verification ECU 9 permits the shifting of devices supplied with power when an engine switch 18 is operated. For example, when the engine switch 18 is operated in a state in which the brake pedal is depressed, the verification ECU 9 starts the engine 6 with the engine ECU 11.

The vehicle 1 is provided with a car sharing system 21 that allows the vehicle 1 to be shared by a number of people. In the present example, the car sharing system 21 includes a car share device 23 installed in the vehicle 1. The car share device 23 is configured to verify the electronic key ID used by the electronic key system 4 of the vehicle 1. Further, the car share device 23 is configured to establish wireless communication with a mobile terminal 22. Encrypted code information Dk obtained from, for example, an external device such as a server 20 is registered to the mobile terminal 22. The car share device 23 obtains the code information Dk from the mobile terminal 22 and authenticates the code information Dk. In the present example, the car share device 23 includes an encryption code (car share device unique encryption code) used to decode the code information Dk. The code information Dk is authenticated when decoded. After the code information Dk is authenticated, the mobile terminal 22 is configured to transmit an operation request to the car share device 23 to request for actuation of the on-board device 3. The mobile terminal 22 may be, for example, a smartphone. Preferably, the code information Dk is, for example, a one-time key (one-time password) that can be used only once.

The car share device 23 is independent from the hardware configuration of the electronic key system 4 and may be retrofitted to the vehicle 1. The car share device 23, for example, functions as an electronic key (vehicle key) that is valid only during the reserved time of the vehicle 1 and is similar to a spare key. In the present example, the car share device 23 cooperates with the mobile terminal 22 so that the mobile terminal 22 functions as a vehicle key in place of the electronic key 2. The car share device 23 has an electronic key function that is switched between a valid state and an invalid state. A state in which the electronic key function of the car share device 23 is valid is equivalent to a state in which an electronic key exists in the vehicle 1. A state in which the electronic key function is invalid is equivalent to a state in which an electronic key does not exist in the vehicle 1. The car share device 23 is supplied with power from a battery+B of the vehicle 1.

In a non-restrictive example, the mobile terminal 22 includes a terminal control unit 26, a network communication module 27, a near-field wireless communication module 28, and a memory 29. The terminal control unit 26 controls the operation of the mobile terminal 22. The network communication module 27 is used to perform network communication between the mobile terminal 22 and an external device such as the server 20. The near-field wireless communication module 28 is used to perform near-field wireless communication between the mobile terminal 22 and the car share device 23. The memory 29 is a data rewritable memory. The mobile terminal 22 obtains the code information Dk from the server 20 via the network communication module 27 and writes the code information Dk to the memory 29. The near-field wireless communication is performed in compliance with, for example, Bluetooth (registered trademark), preferably, Bluetooth® Low Energy (BLE).

A user interface (UI) application 30 is installed in the mobile terminal 22 to manage operation of the car sharing system 21. The UI application 30 is, for example, downloaded from the server 20 and installed in the terminal control unit 26. In the present example, a user authentication code is registered to the memory 29 of the mobile terminal 22. The user authentication code is used when the mobile terminal 22 communicates with the car share device 23 of the vehicle 1 to actuate the on-board device 3 in accordance with the operation of the mobile terminal 22. The user authentication code may be, for example, a random number of which value changes whenever generated. The user authentication code may be registered in advance to the car sharing system 21 or generated when the vehicle 1 is used.

In a non-restrictive example, the car share device 23 includes a controller 33, a smart communication block 34, a near-field wireless module 35, a memory 36, and a timer 37. The controller 33 controls operation of the car share device 23. The smart communication block 34 is used to establish smart communication (short range wireless communication) between the car share device 23 and the electronic key system 4 (verification ECU 9). The near-field wireless module 35 is used to establish near-field wireless communication between the mobile terminal 22 and the car share device 23.

The memory 36 is a data rewritable memory. The memory 36 stores a car share device ID, a car share device unique encryption code, the electronic key ID, and the electronic key unique encryption code. The car share device ID and the car share device unique encryption code are information unique to the car share device 23. The car share device unique encryption code is used to decode the code information Dk used for encrypted communication between the mobile terminal 22 and the car share device 23. The car share device unique encryption code may be stored in the server 20. The mobile terminal 22 may obtain the code information Dk, which is encrypted by the car share device unique encryption code, from the server 20. The car share device ID is, for example, associated with a vehicle ID (vehicle body number). This associates the car share device 23 with the vehicle 1. As described above, the electronic key ID and the electronic key unique encryption code are information unique to the electronic key 2 and used for electronic key ID verification (in the present example, smart verification) performed with the electronic key system 4. The timer 37 manages the date and time in the car share device 23. The timer 37 is implemented by, for example, a soft timer.

The car share device 23 includes a key function unit 38 that performs electronic key ID verification (in the present example, smart verification) through smart communication established by the smart communication block 34 between the electronic key system 4 (verification ECU 9) and the car share device 23. The key function unit 38 is arranged in the controller 33. For example, the car share device 23 includes one or more processors and a memory storing one or more instructions. The one or more processors execute instructions so that the controller 33 functions as the key function unit 38. The key function unit 38 obtains the code information Dk from the mobile terminal 22 and authenticates the code information Dk. When authentication of the code information Dk is accomplished in a normal manner, the key function unit 38 is allowed to perform electronic key ID verification through smart communication with the verification ECU 9. For example, when the mobile terminal 22 is operated to actuate the on-board device 3, the key function unit 38 performs electronic key ID verification (in the present example, smart verification) between the car share device 23 and the verification ECU 9 through a process similar to the electronic key ID verification performed between the electronic key 2 and the verification ECU 9. When electronic key ID verification is accomplished, actuation of the on-board device 3 is performed or permitted in accordance with operation of the mobile terminal 22.

The car sharing system 21 further includes a key function invalidating unit 41 that switches the key function unit 38 from a valid state to an invalid state. For example, the key function invalidating unit 41 is arranged in the controller 33 of the car share device 23. In this case, a processor of the car share device 23 executes instructions so that the controller 33 functions as the key function invalidating unit 41. In the present example, the key function invalidating unit 41 invalidates the key function unit 38 when a condition for switching the key function unit from a valid state to an invalid state is satisfied. In a non-restrictive example, the key function invalidating unit 41 switches the key function unit 38 from a valid state to an invalid state when determining that one of conditions A to C listed below are satisfied.

A) Wireless communication between the mobile terminal 22 and the car share device 23 has been interrupted after the key function unit 38 was switched to a valid state.

B) The received signal strength indicator (RSSI) of radio waves in the wireless communication established between the mobile terminal 22 and the car share device 23 is less than or equal to a threshold value.

C) The elapsed time from when the key function unit 38 was switched to the valid state is longer than or equal to a threshold value (e.g., fixed time).

The operation of the car sharing system 21 will now be described with reference to FIGS. 2 to 5.

Figure 2:
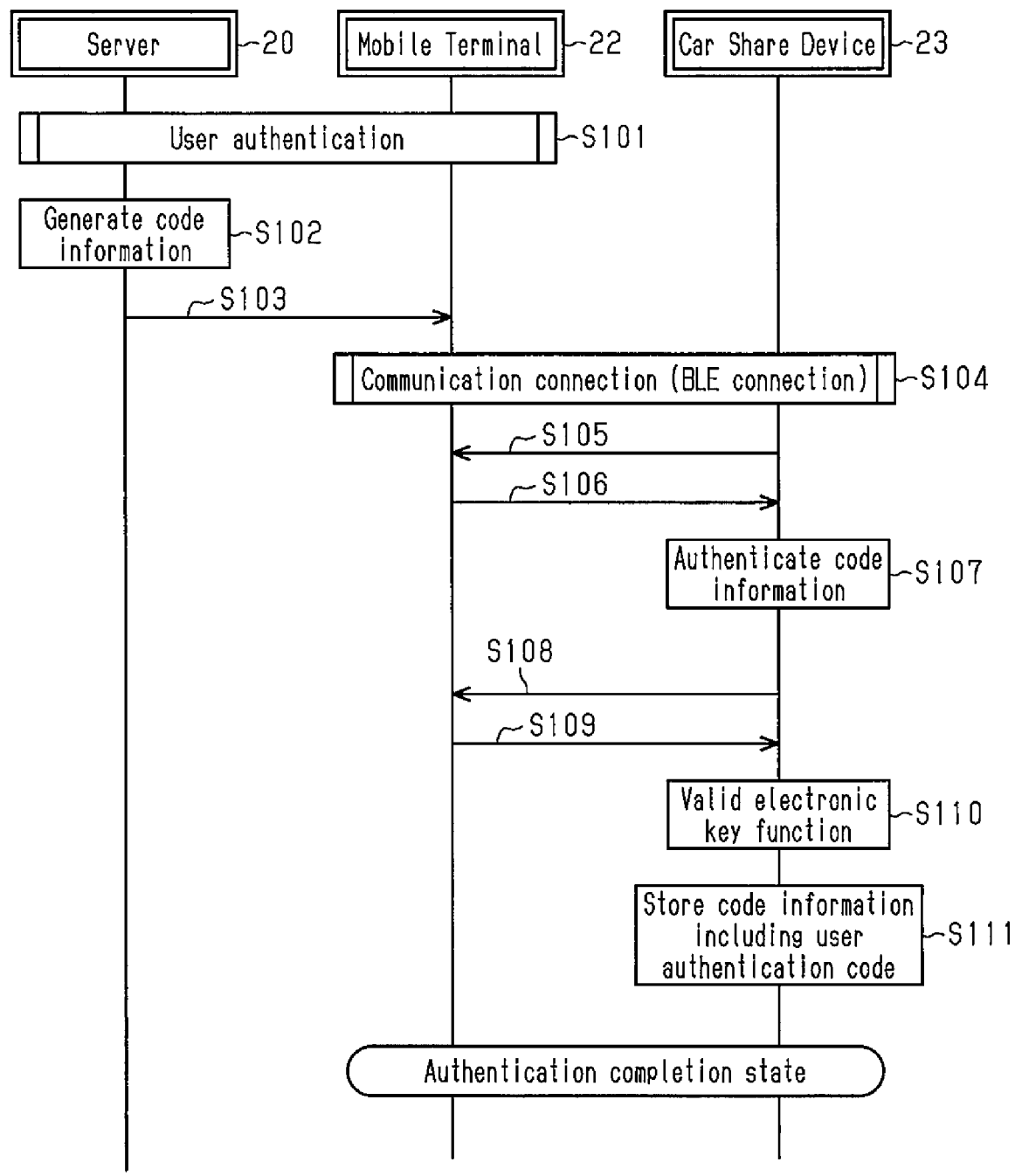
FIG. 2 is a diagram illustrating an example communication sequence for code information authentication.

As illustrated in FIG. 2, in step S101, the server 20 authenticates the user of the mobile terminal 22 (user reserving vehicle 1) through network communication with the mobile terminal 22 (UI application 30). For example, the user authentication is performed using a user ID and a password input to the mobile terminal 22 (UI application 30). In the user authentication, a usage reservation procedure is performed to register reservation information of the vehicle 1. The reservation information of the server 20 includes, for example, the reserved vehicle and the reserved date and time. When the user has been verified by the server 20 with the user ID and password, the process proceeds to step S102. When user verification is unaccomplished, the process is forcibly ended.

In step S102, the server 20 generates the code information Dk. For example, the car share device unique encryption code of the car share device 23 installed in the vehicle 1 (reserved vehicle) may be registered to the server 20. The server 20 may use the car share device unique encryption code to generate the code information Dk. For example, the server 20 uses an encryption expression (encryption algorithm) to encrypt a plain text with the car share device unique encryption code and obtain the encrypted text as the code information Dk. The information of the plain text includes, for example, the reserved date and time of the vehicle 1, a terminal ID that is unique to the mobile terminal 22, the user authentication code used as an encryption code for encrypted communication between the mobile terminal 22 and the car share device 23, and the like. Accordingly, the code information Dk includes the reserved time and date, the terminal ID, and the user authentication code.

In step S103, the server 20 transmits the code information Dk to the mobile terminal 22 through network communication.

In step S104, the mobile terminal 22 (UI application 30) executes near-field wireless communication (in the present example, BLE) connection with the car share device 23. For example, the car share device 23 cyclically transmits advising packets. When the mobile terminal 22 receives an advising packet in the reservation period during which the vehicle 1 is rented, the mobile terminal 22 transmits a communication connection request to the car share device 23. In response to the communication connection request from the mobile terminal 22, the car share device 23 establishes BLE communication with the mobile terminal 22. The car share device 23 transmits a communication connection acknowledgement notifying the establishment of BLE communication to the mobile terminal 22.

In step S105, the car share device 23 transmits a code information request that requests for the code information Dk to the mobile terminal 22. In step S106, in response to the code information request, the UI application 30 of the mobile terminal 22 transmits the code information Dk to the car share device 23.

In step S107, the car share device 23 verifies the code information Dk. In the present example, the car share device 23 uses the car share device unique encryption code to decode the code information Dk. When decoding of the code information Dk is accomplished, the car share device 23 determines that the code information Dk transmitted from the mobile terminal 22 is correct. When authentication of the code information Dk is successful, the car share device 23 extracts the reservation date and time and the terminal ID from the code information Dk. When authentication of the code information Dk is unsuccessful, the car share device 23 determines that the code information Dk is incorrect and shuts down communication.

In step S108, the car share device 23 transmits the user authentication code of the code information Dk to the mobile terminal 22.

In step S109, the UI application 30 of the mobile terminal 22 transmits the electronic key function validation request to the car share device 23. The electronic key function validation request is a request for switching the electronic key function (key function unit 38) of the car share device 23 to a valid state.

In step S110, in response to the electronic key function validation request from the mobile terminal 22, the car share device 23 switches the electronic key function (key function unit 38) from an invalid state to a valid state. This allows the car share device 23 to execute electronic key ID verification through LF-UHF bidirectional communication with the verification ECU 9.

In step S111, the car share device 23 stores information extracted from the code information Dk, namely, the user authentication code and the like in the memory 36. After the information extracted from the code information Dk is stored in the memory 36, the mobile terminal 22 and the car share device 23 both shift to an authentication completion state. This allows the mobile terminal 22 to be used in place of the electronic key 2 as an electronic key (vehicle key) of the vehicle 1.

Figure 3:
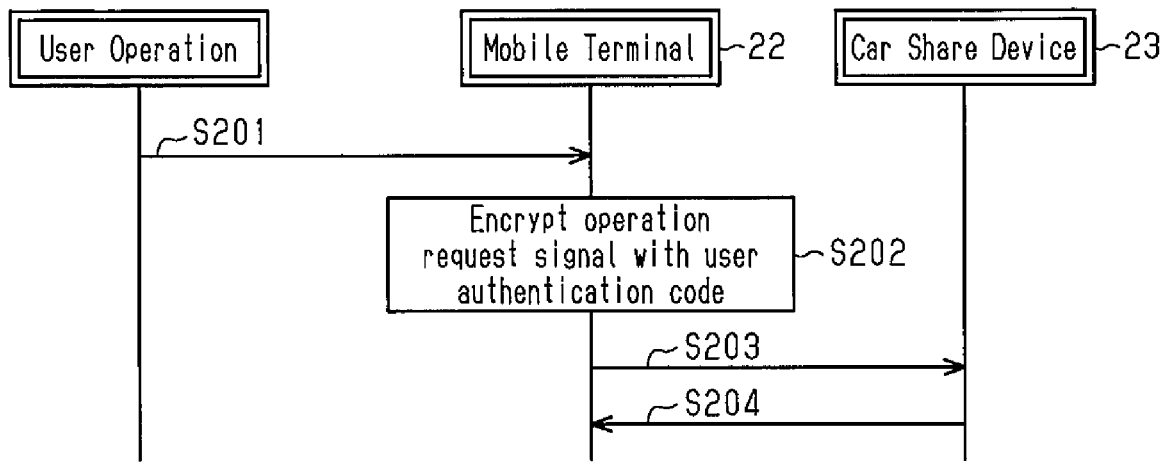
FIG. 3 is a diagram illustrating an example communication sequence for a case in which a mobile terminal is operated to actuate an on-board device.

As illustrated in FIG. 3, in step S201, the user operates and activates an operation request button of the mobile terminal 22 which is in the authentication completion state. The operation request button is used to actuate the on-board device 3 and may be, for example, an unlock request button for unlocking the vehicle door 13, a lock request button for locking the vehicle door 13, an engine start button for starting the engine 6, or the like.

In step S202, the UI application 30 of the mobile terminal 22 encrypts an operation request signal, which corresponds to the operation request button, with the user authentication code. In a non-restrictive example, the operation request signal may include a device actuation command corresponding to the operation request button, the electronic key ID, and the electronic key unique encryption code.

In step S203, the UI application 30 of the mobile terminal 22 transmits the encrypted operation request signal to the car share device 23 through near-field wireless communication (BLE communication).

In step S204, when the car share device 23 receives the operation request signal, the car share device 23 transmits a request acceptance response to the mobile terminal 22. Then, the car share device 23 communicates with the electronic key system 4 and actuates the on-board device 3 in accordance with the received operation request signal. In a non-restrictive example, the car share device 23 establishes smart communication with the verification ECU 9 of the electronic key system 4 through the smart communication block 34 and sends a device actuation command and the electronic key ID to the verification ECU 9. The verification ECU 9 performs electronic key ID verification. When the electronic key ID verification is accomplished, the verification ECU 9 sends the device actuation command to the on-board device ECU of the corresponding on-board device 3 to actuate the corresponding on-board device 3.

For example, if the device actuation command is an unlock request command for the vehicle door 13, the body ECU 10 actuates the door lock device 5 to unlock the vehicle door 13. If the device actuation command is a lock request command for the vehicle door 13, the body ECU 10 actuates the door lock device 5 to lock the vehicle door 13. If the device actuation command is a starting request command for the engine 6, the engine ECU 11 permits starting of the engine 6. For example, if the engine switch 18 is operated when the brake pedal is depressed, the engine ECU 11 starts the engine 6. In addition to electronic key ID verification, challenge-response authentication using the electronic key unique encryption code may be performed between the verification ECU 9 and the car share device 23 if necessary. In this manner, smart verification may be performed between the car share device 23 and the verification ECU 9 in the same manner as the smart verification performed between the electronic key 2 and the verification ECU 9.

Figure 4:
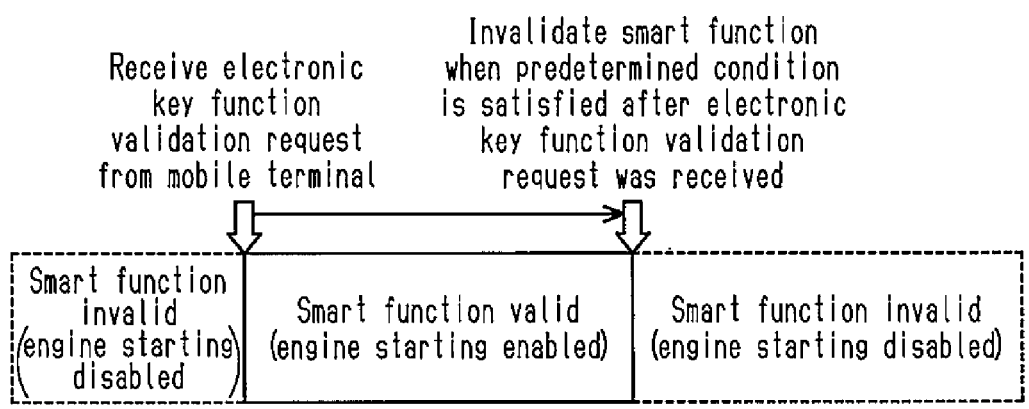
FIG. 4 is a diagram illustrating an example of a series of process for invalidating a key function unit that has been validated.

As illustrated in FIG. 4, the key function unit 38 of the car share device 23 becomes valid when an electronic key function validation request is received from the mobile terminal 22. After the key function unit 38 is switched to the valid state, the key function invalidating unit 41 determines whether or not a condition for returning the key function unit 38 to an invalid state has been satisfied. The key function unit 38 is invalidated if, for example, wireless communication is interrupted between the mobile terminal 22 and the car share device 23, that is, if condition A is satisfied. In this case, the key function invalidating unit 41 monitors near-field wireless communication (in the present example, BLE communication) and invalidates the key function unit 38 if BLE communication is interrupted as the mobile terminal 22 (user) moves away from the car share device 23.

Alternatively, the key function unit 38 may be invalidated if the RSSI of the radio waves in the wireless communication established between the mobile terminal 22 and the car share device 23 is less than or equal to a threshold value, that is, if condition B is satisfied. In this case, the key function invalidating unit 41 includes, for example, a signal strength measurement circuit in at least one of the mobile terminal 22 and the car share device 23. The signal strength measurement unit measures the RSSI of the radio waves received through the near-field wireless communication (in the present example, BLE communication). The key function invalidating unit 41 monitors the RSSI measured by the signal strength measurement and invalidates the key function unit 38 when the RSSI is less than or equal to the threshold value.

The key function unit 38 may also be invalidated if the elapsed time from when the key function unit 38 was switched to a valid state is longer than or equal to the threshold value (e.g., fixed time), that is, if condition C is satisfied. In this case, the key function invalidating unit 41 monitors the elapsed time from when the key function unit 38 was switched to a valid state, and invalidates the key function unit 38 when the elapsed time is longer than or equal to the threshold value.

Figure 5:
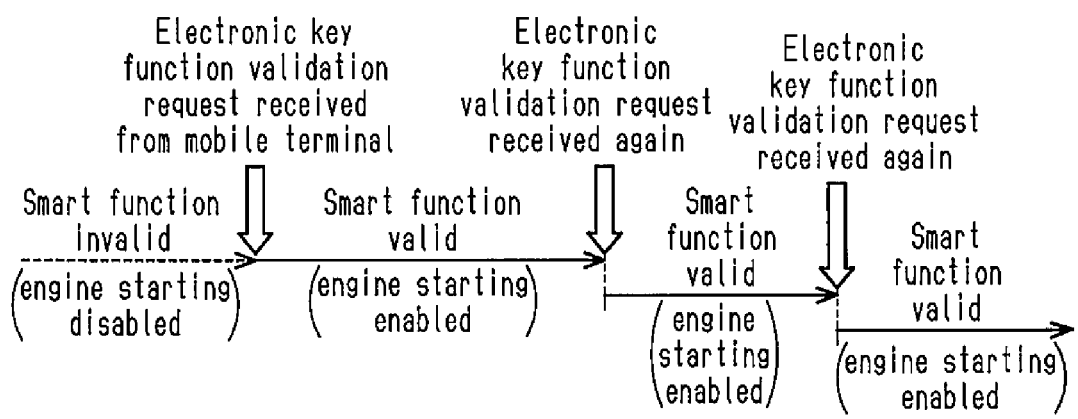
FIG. 5 is a diagram illustrating an example of a process for keeping the key function unit valid.

As illustrated in FIG. 5, after being authenticated, the mobile terminal 22 may transmit an electronic key function validation request to the car share device 23 in regular or non-regular intervals. The transmission interval of the electronic key function validation request is not particularly limited and may be set to any transmission intervals. Thus, as long as BLE communication is established between the mobile terminal 22 and the car share device 23 while the mobile terminal 22 is located in the vicinity of the car share device 23, the car share device 23 is able to receive the electronic key validation request from the mobile terminal 22 in regular or irregular intervals. Accordingly, as long as the car share device 23 receives the electronic key function validation request from the mobile terminal 22, the key function invalidating unit 41 keeps the key function unit 38 valid.

The car sharing system 21 in accordance with the present embodiment has the advantages described below.

The key function invalidating unit 41 invalidates the key function unit 38 if a condition is satisfied for switching the key function unit 38 of the car share device 23 from a valid state to an invalid state. This avoids a situation in which the key function unit 38 of the car share device 23 is left in a valid state when the user is not in the vicinity of the vehicle 1. Thus, security of the vehicle 1 is improved against unauthorized use.

The key function invalidating unit 41 invalidates the key function unit 38 when determining after the key function unit 38 is switching to a valid state that wireless communication has been interrupted between the mobile terminal 22 and the car share device 23. For example, wireless communication is interrupted between the mobile terminal 22 and the car share device 23 when the user (mobile terminal 22) moves away from the vehicle 1 after the vehicle 1 is stopped. In this case, the key function invalidating unit 41 invalidates the key function unit 38. This improves security of the vehicle 1 against unauthorized use. Interruption in the wireless communication can be monitored with a simple configuration. Thus, the key function invalidating unit 41 can be easily configured.

The key function invalidating unit 41 measures the received signal strength indicator (RSSI) of radio waves in the wireless communication established between the mobile terminal 22 and the car share device 23 and invalidates the key function unit 38 when the RSSI is less than or equal to the threshold value. For example, the RSSI decreases as the user (mobile terminal 22) moves away from the vehicle 1 after stopping the vehicle 1. When the RSSI is less than or equal to the threshold value, the key function unit 38 is invalidated. This improves security of the vehicle 1 against unauthorized use. Further, RSSI monitoring is performed with a simple configuration. Thus, the key function invalidating unit 41 can be easily configured.

The key function invalidating unit 41 invalidates the key function unit 38 if the elapsed time from when the key function unit 38 was switched to a valid state is longer than or equal to the threshold value (e.g., fixed time). This configuration automatically invalidates the key function unit 38. For example, if the user (mobile terminal 22) stops the vehicle 1 and leaves the vehicle 1 for a certain period or longer with the key function unit 38 left valid, the key function unit 38 is automatically invalidated. This improves security against unauthorized use of the vehicle 1.

The key function unit 38 is switched from an invalid state to a valid state in response to an electronic key function validation request received in regular or irregular intervals from the mobile terminal 22 after the code information Dk has been authenticated. In this case, the key function invalidating unit 41 keeps the key function unit 38 valid as long as the car share device 23 receives the electronic key function validation request from the mobile terminal 22. Thus, the key function unit 38 is not inadvertently invalidated, and user convenience is maintained in a preferred manner.

It should be apparent to those skilled in the art that the foregoing embodiments may be implemented in many other specific forms without departing from the scope of this disclosure. Particularly, it should be understood that the foregoing embodiments may be implemented in the following forms.

The conditions for switching the key function unit 38 from a valid state to an invalid state are not limited to conditions A to C. For example, the key function invalidating unit 41 may detect the present position of the vehicle 1 with a GPS sensor (not illustrated), which is installed in the vehicle, after the key function unit 38 is switched to a valid state and invalidate the key function unit 38 when the vehicle 1 has not moved from the present position for a predetermined time or longer. In this manner, the condition for switching the key function unit 38 from a valid state or an invalid state may be changed to another condition.

The condition for keeping the key function unit 38 valid is not limited to the car share device 23 receiving an electronic key function validation request from the mobile terminal 22. For example, as long as the engine of the vehicle 1 is running, the key function unit 38 may be kept valid. Alternatively, the key function unit 38 may be kept valid under another condition.

The mobile terminal 22 and the car share device 23 may obtain the user authentication code through any procedure or process.

The code information Dk does not have to be encrypted by the car share device unique encryption code and may be encrypted by any other encryption code.

The content of the code information Dk may be changed to one other than that of the above embodiment.

The code information Dk does not have to be generated by the server 20 and may be generated by any other external device.

The condition for switching the key function unit 38 from an invalid state to a valid state is not limited to the condition described above and may be any other condition. As long as the code information Dk is satisfied, the key function unit 38 may be validated at any timing.

The engine 6 may be started by, for example, operating an "engine start" button shown on the display of the mobile terminal 22.

In the smart verification of the key-operation-free system (electronic key system 4), the exterior transmitter and the interior transmitter do not have to be used to determine whether the electronic key 2 is located inside the vehicle 1 or outside the vehicle 1. For example, left and right antennas (LF antennas) may be arranged on the vehicle body, and the combination of the response of the electronic key 2 to the radio waves transmitted from each antenna may be checked to determine whether the electronic key 2 is located inside the vehicle 1 or outside the vehicle 1.

The smart verification of the electronic key system 4 does not have to perform both electronic key ID verification and challenge-response authentication. As long as electronic key ID verification is performed, any verification process may be performed. Further, any verification may be performed in lieu of the challenge-response authentication.

In the electronic key system 4, instead of using the verification ECU 9, the electronic key 2 may initiate wireless communication and execute electronic key ID verification.

The electronic key 2 is not limited to a Smart Key (registered trademark) and may be any other wireless key.

The near-field wireless communication is not limited to Bluetooth communication and may be of any type of communication protocol.

The code information Dk is not limited to a one-time key and may be any information of which use is restricted.

The encryption code used for encrypted communication may be, for example, any one of the car share device unique encryption code, the user authentication code, and the electronic key unique encryption code. For example, the encryption code used during a process may be switched to improve communication security.

Communication between the verification ECU 9 (electronic key system 4) and the car share device 23 is not limited to wireless communication and may be wired communication.

There is no limit to where the car share device 23 can be installed.

The mobile terminal 22 is not limited to a smartphone and may be any other mobile terminal.

All examples and conditional language recited herein are intended for pedagogical purposes to aid the reader in understanding the principles of the invention and the concepts contributed by the inventors to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

What is claimed is:

1. A car sharing system comprising:
a car share device installed in a vehicle and including a key function unit configured to verify an electronic key ID used by an electronic key system of the vehicle,
wherein the car share device is configured to communicate with a mobile terminal that is operable as a vehicle key when code information is registered to the mobile terminal, and
wherein the car share device is further configured to authenticate the code information through wireless communication with the mobile terminal, switch the key function unit from an invalid state to a valid state in response to an electronic key function validation request from the mobile terminal after the code information has been authenticated, and permit actuation of an on-board device by verifying the electronic key ID with the electronic key system by the key function unit when the mobile terminal is operated to actuate the on-board device; and
a key function invalidating unit that invalidates the key function unit that has been validated when a condition is satisfied for switching the key function unit from the valid state to the invalid state.

2. The car sharing system according to claim 1, wherein the key function invalidating unit invalidates the key function unit when detecting that the wireless communication established between the mobile terminal and the car share device has been interrupted after the key function unit was switched to the valid state.

3. The car sharing system according to claim 1, wherein the key function invalidating unit measures a received signal strength indicator of radio waves in the wireless communication established between the mobile terminal and the car share device and invalidates the key function unit when the received signal strength indicator is less than or equal to a threshold value.

4. The car sharing system according to claim 1, wherein the key function invalidating unit invalidates the key function unit if an elapsed time from when the key function unit was switched to the valid state is longer than or equal to a threshold value.

5. The car sharing system according to claim 1, wherein
the key function unit is switched from the invalid state to the valid state in response to the electronic key function validation request received in regular or irregular intervals from the mobile terminal after the code information has been authenticated, and
the key function invalidating unit keeps the key function unit in the valid state as long as the car share device receives the electronic key function validation request from the mobile terminal.

* * * * *